United States Patent [19]

Ridge, Jr.

[11] Patent Number: 4,554,295

[45] Date of Patent: Nov. 19, 1985

[54] METHOD FOR PREPARING FLEXIBLE POLYURETHANE FOAMS FROM POLYMER/POLYOLS AND IMPROVED POLYURETHANE FOAM PRODUCT

[75] Inventor: Charles A. Ridge, Jr., Cookeville, Tenn.

[73] Assignee: Eastern Foam Products, Inc., Cookeville, Tenn.

[21] Appl. No.: 513,431

[22] Filed: Jul. 13, 1983

[51] Int. Cl.$^4$ ............................................. C08G 18/14
[52] U.S. Cl. .................................... 521/110; 521/111; 521/112; 521/137
[58] Field of Search ................ 521/111, 110, 112, 137

[56] References Cited

U.S. PATENT DOCUMENTS

| | | | |
|---|---|---|---|
| 3,125,540 | 3/1964 | Loew et al. | 521/76 |
| 3,210,300 | 10/1965 | Leibu et al. | 521/112 |
| 3,304,273 | 2/1967 | Stamberger | 521/88 |
| 3,383,351 | 5/1968 | Stamberger | 524/762 |
| 3,433,752 | 3/1969 | Zagoren et al. | 521/112 |
| 3,454,504 | 7/1969 | Murai et al. | 521/160 |
| 3,652,639 | 3/1972 | Pizzini et al. | 260/465.4 |
| 3,741,917 | 6/1973 | Morehouse | 521/112 |
| 3,748,288 | 7/1973 | Winkler et al. | 521/52 |
| 3,793,237 | 2/1974 | Watkinson | 521/112 |
| 3,823,201 | 7/1974 | Pizzini et al. | 524/762 |
| 3,884,848 | 5/1975 | Ricciardi et al. | 521/130 |
| 3,905,924 | 9/1975 | Prokai | 521/111 |
| 3,920,587 | 11/1975 | Watkinson | 521/111 |
| 3,926,866 | 12/1975 | Komatsu et al. | 521/110 |
| 3,953,393 | 4/1976 | Ramlow et al. | 525/41 |
| 4,003,847 | 1/1977 | Prokai | 252/350 |
| 4,119,586 | 10/1978 | Shah | 521/137 |
| 4,140,667 | 2/1979 | Preston et al. | 521/137 |
| 4,148,840 | 4/1979 | Shah | 521/137 |
| 4,190,417 | 2/1980 | Prochaska et al. | 8/2.5 R |
| 4,282,331 | 8/1981 | Priest | 521/137 |
| 4,286,074 | 8/1981 | Davis et al. | 521/137 |
| 4,304,872 | 12/1981 | Tenhagen | 521/52 |

FOREIGN PATENT DOCUMENTS

| | | |
|---|---|---|
| 839184 | 6/1960 | United Kingdom . |
| 974986 | 11/1964 | United Kingdom . |
| 1028810 | 5/1966 | United Kingdom . |
| 1156783 | 7/1969 | United Kingdom . |

OTHER PUBLICATIONS

Saunders, K. S., Organic Polymer Chemistry, Chapman & Hall London, 1973, pp. 329-335.

*Primary Examiner*—John Kight
*Assistant Examiner*—Marvin L. Moore
*Attorney, Agent, or Firm*—Banner, Birch, Mckie & Beckett

[57] ABSTRACT

A process for preparing a predominately closed cell foam having an improved load bearing resiliency together with the improved polyurethane foam product, the process comprising co-reacting a fluid high-solids polymer/polyol and an organic polyisocyanate in the presence of an organo-tin catalyst, a tertiary amine catalyst, a blowing agent, a silicone-oxyalkylene surfactant and a critical amount of a filled diorganosilicone oil anti-foaming agent.

23 Claims, 4 Drawing Figures

(1:1)

(20X)

METHOD FOR PREPARING FLEXIBLE POLYURETHANE FOAMS FROM POLYMER/POLYOLS AND IMPROVED POLYURETHANE FOAM PRODUCT

BACKGROUND OF THE INVENTION

1. Field of the Invention

The present invention relates to the preparation of flexible polyurethane foams having improved physical properties by the reaction of polymer polyls with polyiscoyanates. More particularly, this invention relates to the preparation of flexible polyurethane foams particularly useful as carpet underlays and padding.

2. Description of the Prior Art

Polyurethane foams generally are prepared by reacting an active hydrogen-containing compound, as determined by the Zerewitinoff method, and a polyisocyanate in the presence of a blowing agent, a reaction catalyst and a foam stabilizer. The most common active hydrogen-containing compounds contain predominantly hydroxyl groups and include polyesters and polyethers. It is widely recognized in the art that the preparation of commercially useful polyurethane foams requires carefully balancing a large number of factors including inter alia the selection of primary reactants and reaction conditions, catalyst selection, and the surfactant employed.

The prior art has described many attempts to improve particular properties of flexible polyurethane foams, e.g., foam density, firmness, etc., without significantly impairing other desirable characteristics so as to produce foams suitable for particular applications. In one approach, various inert filler materials are blended into the foaming mixture during polymerization. While such modifiers can successfully increase foam density, and at times improve foam firmness, such additives generally lead to a deterioration in other important foam properties. In particular, dynamic properties such as durability generally are unavoidably impaired and the life of the foam under dyanmic use is reduced greatly. Consequently, filled flexible foams typically have been limited to specialty products.

In another approach, exemplified by U.S. Pat. No. 3,506,600, a densified, flexible polyurethane foam is prepared by passing a partially cured cellular foam material through the nip of opposing pressure rollers. This approach not only adds to processing costs, but also creates a large density gradient across the vertical section of the densified foam. Such a gradient is udesirable since it results in the production of unnecessary and often useless by-product material.

Most recently, improved polyol precursors have been developed which can be used to produce flexible polyurethane foams having enhanced load bearing resiliency. These polymer/polyols or graft polyols are prepared by the in situ polymerization of ethyleneically unsaturated monomers in an appropriate polyol in the presence of a free radical catalyst. When used as the starting polyol reactant in the preparation of flexible foams, these polymer/polyols commonly are mixed with conventional polyether polyols to optimize product characteristics, reduce cost, and make the polyol component easier to handle. Otherwise, these polymer/polyols tends to degrade certain characteristics such as tear, tensile and elongation properties and fire retardancy evident in less firm flexible foams.

The prior art has also disclosed that the cellular structure of polyurethane foams prepared by the reaction of a polyisocyanate with a polyester and/or a polyether polyol can be modified to an open, non-uniform cellular structure resembling a natural sponge by adding filled or unfilled diorganosilicone oil to the reactant mixture. Filled diorganosilicone oils have not been used, however, specifically to improve the load bearing resiliency of flexible polyurethane foams, particularly foams prepared by reacting a high solids polymer/polyol with a polyisocyanate.

It is therefore an object of the present invention to provide a method for preparing a flexible polyurethane foam having excellent firmness.

It is another object of this invention to provide a method for preparing a firm, flexible polyurethane foam without impairing the cushioning characteristics of the foam.

It is a further object of the present invention to provide a method for preparing a flexible polyurethane foam having exellent physical properties that does not require post-formation processing steps.

It is still another object of this invention to provide a method for controllably altering the cellular structure of a flexible polyurethane foam so as to improve its load bearing resiliency.

Still a further object of the present invention is to provide a modified polyurethane foam having improved resilience characteristics making it ideally suited for use as a carpet underlay or padding.

These and other objects, advantages and features will be apparent to those skilled in the art from the following disclosure and appended claims.

SUMMARY OF THE INVENTION

The present invention provides a process for preparing flexible polyurethane foams by the one-shot technique comprising co-reacting a fluid high-solids polymer/polyol and an organic polyisocyanate in the presence of an organo-tin catalyst, a tertiary amine catalyst, a blowing agent, a silicone-oxyalkylene surfactant and an amount of a filled diorganosilicone oil anti-foaming agent necessary to produce predominately closed cell foam having an improved load bearing resiliency.

The present invention also provides a predominatly closed cell, flexible polyurethane foam having improved load bearing resiliency prepared by reacting a fluid high-solids polymer/polyol and an organic polyisocyanate, said foam having substantially a bivariate cell size distribution of large cells and small cells, wherein said large cells have diameters between about 1.50 mm and about 7 mm, occur at any cross-section of said foam at a density of about 50 to about 200 cells per square inch of said foam, and are randomly distributed throughout a substantially continuous matrix of said small cells, said small cells having diameters less than about 1.25 mm.

DETAILED DESCRIPTION OF THE INVENTION

Figure 1:
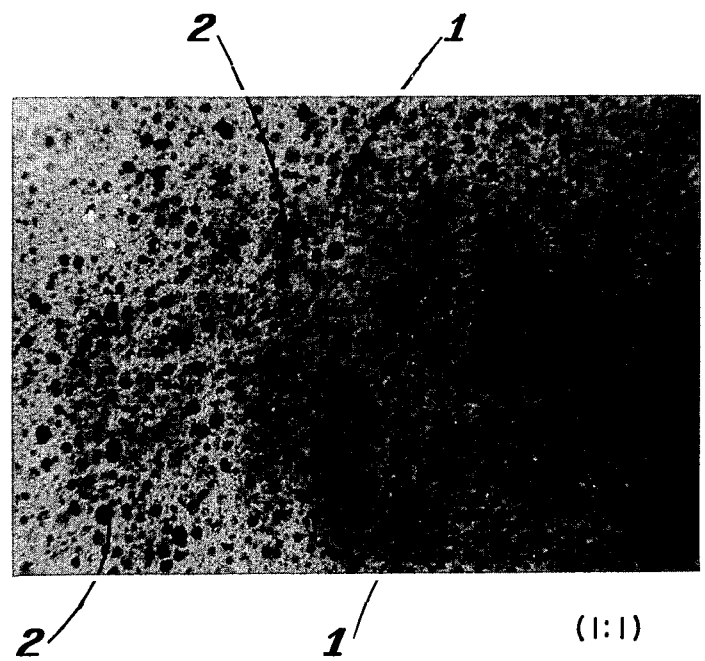
FIG. 1 is a photograph of the appearance of the structure of a flexible polyurethane foam made in accordance with this invention.

The present invention is based on the surprising discovery that the properties of a flexible polyurethane foam, prepared by reacting a fluid high solids polymer/polyol with an organic polyisocyanate, can be modified in a consistent and predictable fashion by adding the specified amount of a filled diorganosilicone oil antifoaming agent to the foaming reactants. Applicant has found that by carefully controlling the amount of the filled diorganosilicone oil use in the foam formulation, the cell dimensions of the foam are restructured in such a way that a flexible foam with improved static and dynamic compression properties is produced. The changes in property observed are totally unexpected.

The process of this invention is carried out using the one-shot foaming technique wherein the polyol and polyisocyanate reactants, the catalysts, blowing agent, surfactant, anti-foaming agent and other optional ingredient are mixed together in a conventional mixing head and the resulting mixture is dispensed into a mold. Preferably, the foam is prepared as slab stock wherein the foaming mixture is discharged from the mixing head onto a continuously moving generally open-topped and open-ended conveyor-type mold. As the conveyor moves, the foaming reactions causes the foam to expand upwardly.

The polymer/polyols or graft polyols used as one foam precursor of this invention are obtained by polymerizing ethyleneically unsaturated monomers in a suitable liquid polyol in the prsence of a free radical catalyst. The overall reaction proceeds in a manner as is known in the art, using conventional reaction conditions, reactants and proportions. Suitable monomers for producing such polymer/polyol compositions, include, for example, acrylonitrile, vinyl choride, styrene, butadiene, vinylidine chloride and the like. The preferred monomers for making polymer/polyol compositions useful in this invention are acrylonitrile and styrene. Co-polymers of acrylonitrile and stryene are particularly preferred.

In the broad practice of this invention, any of the known polymerizable monomers can be used and the compounds listed above are illustrative and not restrictive of the monomers suitable for use in this invention. Other suitable monomers will readily be apparent to one skilled in this art. The monomer generally is selected to give a polyurethane product with desired properties.

Suitable polyols for producing the polymer/polyol include the polyhydroxyalkanes; the polyoxyalkylene polyols and the like. Other suitable polyols can be selected from one or more of the following classes of compositions alone or in admixture:

(a) alkylene oxide adducts of polyhydroxyalkanes;

(b) Alkylene oxide adducts of non-reducing sugars and sugar derivatives;

(c) Alkylene oxide adducts of phosphorus and polyphosphorus acids;

(d) Alkylene oxide adducts of polyphenols;

(e) Alchols derived from mono- and polyamines by the addition of alklyene oxides;

(f) Polytetramethylene glycols, and the like; and (g) The polyols from nautural oils such as castor oil and the like.

Illustrative alkylene oxide adducts of polyhydroxyalkanes include, among others, those adducts of ethylene glycol, propylene glycol, 1,3- dihydroxypropane, 1,3-dihydroxybutane, 1,4-dihydroxybutane, 1,4-, 1,5-, and 1,6-dihydroxyhexane, 1,2-, 1,3-, 1,4-, 1,6- and 1,8- dihydroxyoctane, 1,10-dihydroxydecane, glycerol, 1,2,4-trihydroxybutane, 1,2,6-trihydroxyhexane, 1,1,1-trimethylolethane, 1,1,1-trimetholpropane, pentaerythritol, xylitol, arabitol, sorbitol, mannitol, and the like, typically having a molecular weight of at least 500: preferably the adducts of ethylene oxide, propylene oxide, epoxybutane, or mixtures thereof.

Two preferred classes of alkylene oxide adducts of polyhydroxyalkanes are the ethylene oxide, propylene, oxide, butylene oxide, or mixtures thereof, adducts of dihydroxyalkanes and adducts of trihydroxyalkanes.

The preferred class of alkylene oxide adducts of dihydroxylalkanes contemplated are the polyoxyalkylene glycols, such as the alkylene oxide adducts of diethylene glycol, triethylene glycol, tetraethylene glycol, dipropylene glycol, tripropylene glycol, tetrapropylene glycol, dibutylene glycol, as well as the high molecular weight polyoxyethylene glycols, high molecular weight polyoxypropylene glycols, mixed ethylene-propylene glycols, mixed polyoxyethylene-polyoxypropylene glycols, and the like.

The polyols employed for making the polymer/polyols useful in the present invention can have hydroxyl numbers which vary over a wide range. In general, the hydroxyl numbers of the polyols employed in preparing the polymer/polyols can range from about 20 and lower, to about 200 and higher, and preferably from about 25 to about 150. The hydroxyl number is defined as the number of milligrams of potassium hydroxide required for the complete hydrolysis of the fully acetylated derivative prepared from 1 gram of polyol. The hydroxyl number can also be defined by the equation:

$$OH = \frac{56.1 \times 1000 \times f}{M.W.}$$

where

OH = hydroxyl number of the polyol f = functionality, that is, average number of hydroxyl groups per molecule of polyol M.W. = molecular weight of the polyol.

Other preferred polyols employed for making the polymer/polyols useful in the present invention include the poly(oxyproplene) glycols, triols and higher functionality polyols. Triols are generally preferred. The poly(oxypropylene-oxyethylene) polyols are also contemplated; generally the oxyethylene content comprises less than 60 percent. As is well known in the art, the preferred polyols for preparing the polymer/polyols useful in this invention are those containing varying small amounts of unsaturation.

Generally, the exact polyol employed depends upon the end-use of the polyurethane product to be produced. The molecular weight and/or the hydroxyl number are selected to give a polyurethane with desired properties.

The polymer/polyols specifically useful in the present invention are those fluid polymer/polyols in which the content of polymer particles in the polymer/polyol ranges from about 25 to about 50 percent by weight. At present, higher polymer contents have not been consistently produced. As used throughout the specification and claims, the phase "high solids polymer/polyol" refers to compositions having the above-noted polymer content. Preferably, the polymer content of the high solids polymer/polyol is above about 30 percent weight. The polymer particles in the polymer/polyols are preferably relatively small in size, preferably less than 30 microns. This invention also contemplates blending additional polyol, e.g., a polyol of the type previously discussed in connection with the preparation of the polymer/polyol, with the high solids polymer/poyol. However, such blends should have a polymer content above about 25 percent. The polymer/polyols are preferably fluid, i.e., liquid, at 25° C.

A more comprehensive discussion of polymer/polyols suitable for the use in the process in this invention, can be found in Stamberger U.S. Pat. Nos. 3,304,273; 3,383,351 and No. Reissue 28,715 (reissue of 3,383,351); the Stamberger British Pat. No. 1,022,434; Pizzini, et al., U.S. Pat. Nos. 3,652,639 and 3,823,201; Ramlow, et al., 3,953,393; Shah 4,119,586 and 4,148,840; and Priest 4,282,331, the disclosures of which are hereby incorporated by reference.

The organic polyisocyanates useful in the present invention are also conventional. They contain at least two isocyanate groups per molecule. The isocyanate mixture selected may have an isocyanate functionality of from about 2 to about 3.0. The useful isocyanates include, for example, aromatic, aliphiatic, cycloaliphatic and heterocyclic polyisocyanates and combinations thereof.

Representative of these types are the diisocyanates such as m-phenylene diisocyanate, tolylene 2,4-diisocyanate, tolylene-2,6-diisocyanate, mixtures of 2,4- and 2,6-hexamethylene-1,6-diisocyanate, tetrmethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'biphenyl diisocyanate, and 3,3'-dimethyldiphenylmethane-4,4'diisocyanate; the triisocyanates such as 4,4',4'-triphenylmethane triisocyanate, polymethylene polyphenylisocyanate and tolylene 2,4,6-triisocyanate and the tetraisocyanates such as 4,4'-dimethyldiphenylmethane-2,2', 5,5'-tetraisocyanate.

Aromatic diisocyanates are generally the least expensive and most reactive polyisocyanates available and, therefore, are preferred. The aromatic diisocyanates, especially mixtures of the 2,4-, 2,6-tolylene diisocyanate isomers, are particularly preferred.

To prepare the polyurethanes of the present invention, an excess of polyisocyanates relative to the polymer/polyol is generally employed. At a minimum, the quantity of polyisocyanate used is that generally sufficient to react with the hydroxyl group of the polymer/polyol, including any additional polyol blended therewith, and any water used to generate carbon dioxide for blowing the mixture. In general, the ratio between the reactive NCO and OH moieties can broadly vary from about 0.8 to about 1.5, usually from about 0.9:1.0 to about 1.35:1. The preferred NCO:OH ratio is about 1:1 to about 1.2:1. Generally, the necessary balancing of the reactants to obtain a foam of desired properties can be determined by routine experimentation.

As indicated above, according to the present invention the polyurethane foam is prepared by reacting the polymer/polyol and organic polyisocyanate in the presence of a blowing agent, catalyst, a surfactant and the specified amount of a filled diorganosilicone oil antifoaming agent.

When producing the polyurethane foam of this invention a small amount of water preferably is included in the reaction mixture as the blowing agent. Generally, from about 0.5 to 5 weight percent water is employed, based upon polymer/polyol. Preferably, between about 1.5 and about 2.5 weight percent is used. Optionally, foaming may be facilitated further through the use of blowing agents which are vaporized by the reaction exotherm. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, and the like. Another class of blowing agents recognized by one skilled in this art includes thermally unstable compounds which liberate gases upon heating. The quantity of blowing agent employed will vary with factors such as the density desired in the foamed product.

The process of this invention also employs small amounts, e.g., about 0.1 percent to about 5.0 percent by weight based on the polymer/polyol, of a silicone-oxyalkylene polyurethane foam surfactant or foam stabilizer. The exact amount of foam surfactant employed depends upon how efficient the surfactant is in stabilizing the foaming cellular matrix. More surfactant is needed as the foam stablilizing efficiency of the surfactant decreases. When using a highly efficient foam surfactant, preferably about 0.75 percent to about 1.25 percent is used. The exact amount used generally depends upon what properties as desired in the foam product, and the proper amount can be determined by routine experimentation. This material does not generally participate in the polyurethane reaction chemistry and remains in the foam product as substantially a chemically unaltered residue.

The foam stabilizer permits bubble generation and stabilization during the critical period it takes the nascent liquid foam to become a self-supporting cellular matrix. Suitable surfactants include both the "hydrolyzable" and the "non-hydrolyzable" nonionic polysiloxane-polyoxyalkylene copolymers. The "non-hydrolyzable" copolymers differ from the "hydrolyzable" copolymers in that the polysiloxane moietly is bonded to the polyoxalkylene moiety through direct carbon-to-silicone bonds, rather than through carbon-to-oxygen-to-silicone bonds.

Many combinations of siloxane molecular weight, of functionality, polyoxyalkylene content and composition and copolymer structure are possible and these parameters control copolymer solubility, balance and geometry, which are primary influences on surfactant behavior, i.e., surfactant efficiency.

Polysiloxane-polyoxyalkylene copolymers useful in the present invention generally contain from about 5 to about 50 weight percent polysiloxane polymer with the remainder being polyoxyalkylene polymer. Suitable surfactants include those compounds which have a polydimethylsiloxane group attached to a copolymer of ethylene oxide and propylene oxide. Polysiloxane-polyoxyalkylene copolymer foam stabilizers have been described, for example, in U.S. Pat. Nos. 2,834,748;

2,917,480; 3,505,377; 3,629,308 and 3,744,917. Other suitable foam stabilizers will occur to those skilled in the art, and include, for example, the cyanoalkoxyalkyl and cyanoalkyl modified siloxane fluids described in U.S. Pat. Nos. 3,952,038; 3,966,784 and 4,003,487.

Polysiloxane-polyoxyalkylene surfactants of the type described above generally are sold as proprietary products, without the disclosure of their precise chemical structure. Applicant has found the Y10178 and L5810 polysiloxane surfactants available from Union Carbide Corporation are suitable for use in the present invention. Y10178 is particularly preferred.

The present invention preferably employs a dual catalyst system including an organo-tin catalyst as the primary catalyst and a tertiary-amine catalyst such as disclosed in U.S. Pat. No. 3,839,384 as a secondary catalyst. The organo-tin catalyzes the reaction between the hydroxyl moiety of the polymer/polyol and the isocyanate moiety; the tertiary-amine primarily catalyzes the water-isocyanate reaction.

The organo-tin catalyst is generally selected from any of the following: stannous salts of carboxylic acids such as stannous octoate, stannous oleate, stannous acetate, stannous laurate and the like; dialkyltin dicarboxylates such as dibutyltin dilaurate, dibutyltin diacetate, dilauryltin diacetate, dibutyltin di(2-ethylhexanoate), dibutyltin maleate, dioctyltin, diacetate, dibutyltin-bis(4-methylaminobezoate), dibutyltin-bis(6-methylaminocaproate), and the like as well as dialkyltin oxides, trialkyltin oxides, tin mercaptides such as, for example, di-n-octyltin mercapide, and the like. Stannous octoate is particularly preferred. The organo-tin catalyst is used in a catalytically effective amount. The organo-tin compound is generally used at a concentration between about 0.1 percent to about 0.5 percent (exclusive of any carrier solvent or non-catalytic additive) based on the weight of the polymer/polyol. Preferably, the organo-tin concentration is from about 0.2 percent to about 0.3 percent. Highly catalytic organo-tin catalysts are employed in the present invention in order to successfully balance the polyurethane forming reaction rate with the dynamics of foam formation and controlled defoaming as more fully described hereafter. Such balancing is very important for producing a foam having the desired structural properties.

Suitable tertiary amine catalysts include trimethylamine, tributylamine; triethylamine; N, N-dimethylcyclohexylamine; N, N-dimethylbenzylamine; triethylenediamine, N,N,N',N'-tetramethylethylenediamine; N,N,N',N'-tetramethyl-1,3-butanediamine; and 1,1,4,7,7-pentamethyldiethylenetramine, 3-dimethylamino-N,N-dimethylpropionamide, bis[2-(N,N-dimethylamino)ethyl]ether, N,N-dimethylethanolamine, 3-dimethylaminopropionitrile; N-methylmorpholine, N-ethylmorpholine, 1,4-dimethylpiperazine and N-(2-hydroxyethyl)piperazine. Other amine catalysts will be apparent to those skilled in the art. Combinations of tertiary-amines can also be employed. As recognized by one skilled in this art, the tertiary amine is used in a catalytically effective amount. Generally, the amine concentration is within the range of about 0.05 percent to 1.5 percent (exclusive of any carrier solvent or non-catalytic additive) based on the weight of the polymer/polyol. Preferably, the amine concentration is from about 0.1 percent to about 0.9 percent.

If desired, other additional ingredients, such as dies, pigments, fire retardants, anti-microbial agents, etc., can be employed in conventional minor amounts in producing the polyurethane foams in accordance with the process of this invention.

The key constituent used in the process of this invention is the filled diorganosilicone oil anti-foaming agent. The diorganosilicone oil can be represented by the formula —$R_2SiO]_n$ wherein n is greater than 1 and R represents a monovalent group such as an unsubstituted hydrocarbon group preferably selected from the group consisting of a methyl group, an ethyl group and a phenyl group, or a subsituted hydrocarbon group preferably selected from the group consisting of a trifluoropropyl group and a trichloroethyl group. A polydimethylsilicone is particularly preferred. The oil is preferably filled with silica ($SiO_2$) although other inert fillers such as oxides of zinc, magnesium, aluminnum, titanium and the like can be alterntively be used. Generally, the inert filler will have a particle size not exceeding about 30 microns. Generally, the weight ratio of diorganosilicone oil to inert filler in the filled oil is between about 1:1 to about 1:2. The filled oil can also be used as an aqueous emulsion.

The viscosity of the filled diorganosilicone oil may vary over a wide range but it is preferably within the range of from about 5000 cps to about 7000 cps at 25° C.

The aforesaid types of additives are generally called oil compound-type of emulsion-type anti-foaming agents of the silicone system, and are commonly used as anti-foaming agents in processes of the food industry, petroleum chemistry, the lubricant industry, the paint industry and the like. In contrast, in the practice of the present invention, this additive is used for a different purpose base on applicant's discovery that adding the specified amount of this material to the polyurethane foam precursors described above unexpectedly alters the cell structure of the finished product, so as to produce a foam with improved load bearing resiliency. The diorganosilicone oil does not generally participate in the polyurethane reaction chemistry and remains in the foam product as substantially a chemically unaltered residue.

The proper amount of the aforesaid anti-foaming agent generally necessary to acheieve the desired structural properties in polyurethane foams prepared with a high solids polymer/polyol and an organic polyisocyanate according to the practice of the present invention is broadly in the range of about 0.02 to about 0.1 percent by weight of the polymer/polyol. Typically, when the filled diorganosilicone oil is used in an amount less than 0.02 percent little change in the cellular structure of the foam occurs. Alternatively, if the amount of filled oil exceeds about 0.1 percent then total cell collapse generally occurs. Preferably, the filled oil is added at a level between about 0.03 to about 0.08 percent.

Applicant has found the optimum level of anti-foaming agent in the reaction mixture depends most strongly on the initial temperature of the foam precursors, i.e., on the temperature of the polymer/polyol and organic polyisocyanate reactants, and on the catalytic properties of the particular catalyst employed. The term "optimum level" refers to the quantity of anti-foaming agent that yields the most desirable polyurethane foam structure for enhancing the foam's load bearing resiliency. In the one-shot procedure employed by this invention the initial temperature of the foam precursors generally varies directly with ambient conditions, since ancilliary temperature control is not generally practiced. For example, at an ambient temperature of a about 68°–74°

F. the anti-foaming agent generally is added at a level between about 0.06 to about 0.09 percent; at an ambient temperture of about 74°–80° F. the anti-foaming agent generally is added at a level between about 0.05–0.06 percent; and at an ambient temperature of about 80°–85° F. the anti-foaming agent generally is added at a level between about 0.03–0.05 percent. Other ambient conditions such as relative humidity and barometric pressure also influence the optimum level of anti-foaming agent to a lesser degree. The general effect of these variables can be determined by routine experimentation, however. While not wishing to be bound by any particular theory, applicant believes that the optimum quantity of anti-foaming agent is determined by the rate of the catalyzed foaming reactions, with a lesser amount required as the catalyzed reaction rate increases. Consequently, relative increases in catalytic activity among the different catalysts that can be employed also influence the optimum level of the anti-foaming agent. Such effects can also be determined by routine experimentation.

The optimum amount of filled diorganosilicone oil needed to produce the desired cell structure modification will necessariy vary as described above depending upon the particular reactants, catalysts and other foam additives employed and upon ambient conditions. Because of the very small amount of filled diorganosilicone oil used in the process of this invention, this component is preferably added using additional polyol as a carrier. This ensures greater precision in the addition of this key component to the reaction mixture. Preferably, an epoxy-modified polyether polyol, described for example in U.S. Pat. No. 4,316,991, is used as the carrier. It is also possible to pre-mix the filled diorganosilicone oil with the polymer/polyol stream. The filled diorganosilicone oil should not be mixed with the polyisocyanate precursor.

Generally, in the formation of polyurethane foams, the polymerizing liquid ingredients start out at low viscosity which rapidly increases as the reaction and coincident foaming progresses. The foam passes through a viscoelastic solid phase and finally becomes an elastomer. The total process takes only a very short time. As foaming takes place, drainage occurs and bubble walls become thinner. In the conventional manufacture of polyurethane foam, the rates of drainage and polymerization generally are balanced so that cells become interconnecting but do not coalesce further before the foam has become elastomeric and self-supporting. As is well-recognized in the art, careful balancing of the catalyst system and surfactant or foam stabilizer is required to achieve the desired effect. The use of highly effective polysiloxane-polyoxyalkylene copolymers as the foam stabilizer ensures the formation of a foam with a uniformly small cell size, e.g., cell sizes less than about 1.25 mm.

Figure 3:
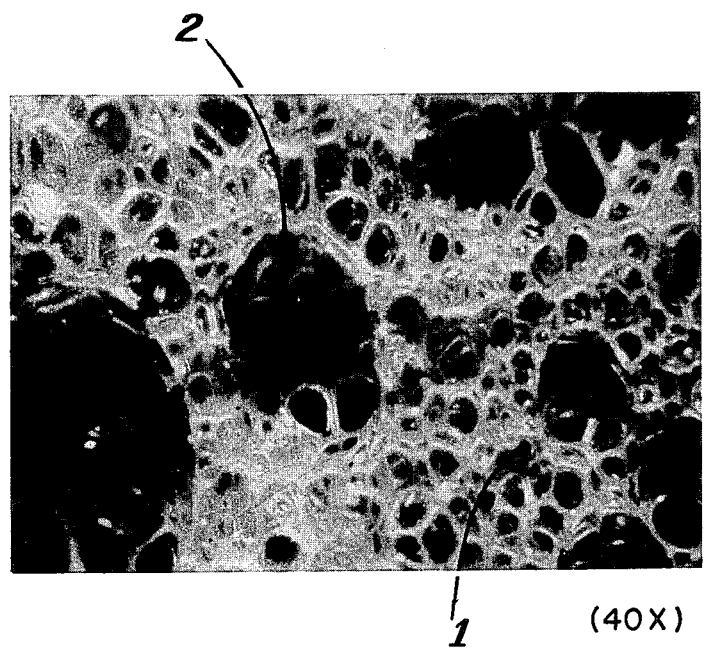
FIG. 3 is a photomicrograph of the appearance of the structure of a flexible polyurethane foam made in accordance with this invention, the magnification being 40×.
Figure 4:
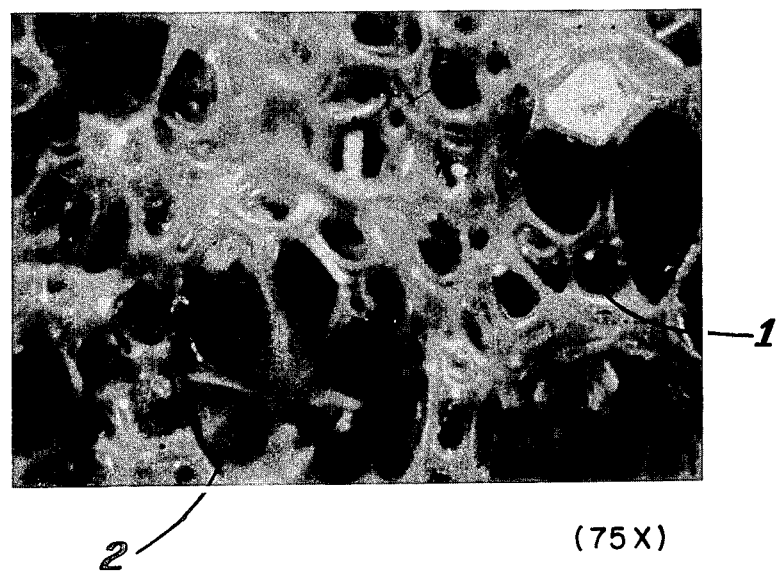
FIG. 4 is a photomicrograph of the appearance of the structure of a flexible polyurethane foam made in accordance with this invention, the magnification being 75×.

Although not wishing to be bound by any particular theory, applicant believes that during foaming the presence of the above-disclosed filled diorganosilicone oil anti-foaming agent causes selective coalescence of these small cells throughout the developing foam. The polymerizing liquid ingredients associated with these coalescing cells drains into the junction region and struts of the remaining cells. The term strut is generally recognized by one skilled in this art and refers to those portions of the foam actually defining individual cells. The junction region is that portion of the foam structure where the struts or cell walls intersect. Consquently, the modified foam contains larger junction regions and thicker struts than are present in the unmodified foam. This aspect of the foam structure is illustrated most clearly in FIGS. 3 and 4. As particularly shown in FIG. 4, the struts forming the cellular matrix typically have a thickness of at least about 0.25 mm at their thinnest point. In fact, some struts have a thickness over 0.5 mm. Applicant believes that the improved foam properties are due in part to the larger junction regions and thicker struts so formed.

This coalescence is limited, however, since numerous substantially uniformly-sized small cells remain distributed throughout the structure and the resulting structure remains predominately closed celled. As used throughout the specification and claims, the phrase "predominately closed celled" means that the foam breathability, measured in accordance with ASTM Test Procedure D-3574-77 TEST G, is less than about 2.0 scfm. Foams produced by the process of this invention generally have breathabilities below about 1.5 scfm.

Figure 2:
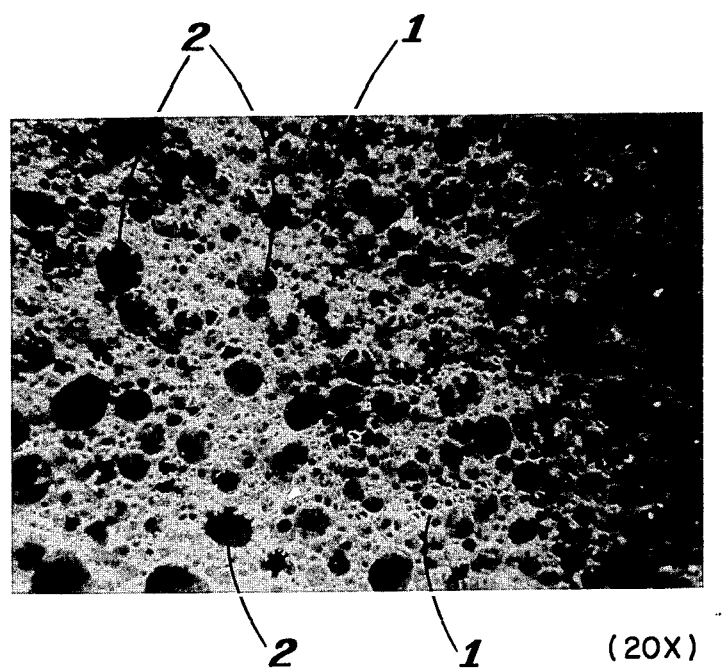
FIG. 2 is a pohotomicrograph of the appearance of the structure of a flexible polyurethane foam made in accordance with this invention, the magnification being 20×.

Quite importantly, however, as noted above, the foam modification is selective, resulting in a completely novel foam structure. More particularly, the small sized cells formed by the presence of the foam stabilizer or surfactant are not completely destroyed. Rather, residual small-size cells 1 are distributed throughout the foam structure coextensive with the larger-size cells 2 arising from selective cell coalescence. Indeed, the overall foam structure comprises a subtantially bivariate cell size distribution with a large cell-size foam superimposed on or intermingled with a small cell-size foam. This novel foam structure is illustrated most clearly in FIGS. 1 and 2. As shown in these figures, large cells 2 having diameter between about 1.5 mm and about 7.0 mm are randomly distributed throughout a matrix of the small cells 1, having diameters less than about 1.25 mm. The large cells are distributed throughout the foam such that they occur at any cross-section of the foam at a density of about 50 to about 200 cells per square inch of foam. Generally, the large cell density is between about 75 to 150 cells per square inch. The foam is viewed in cross-section to examine its structure. As used herein, the term cell diameter means the internal distance from cell wall to cell wall. For the purpose of this invention, this dimension can suitably be approximated by the diameter of a circle eqivalent to the cell cross-sectional area, as viewed in photomicrographs of the type illustrated in FIG. 2. Generally, a significant portion (generally major) of the large cell diameters are above about 1.75 mm, and a significant portion (generally major of the small cells diameters are less than about 1.0 mm. Obviously, there will be a small fraction of cells having diameters (sizes) falling between the large cell and small cell size range. The various structural features of a foam, i.e., cell diameters and strut thichness, can best be measured by visual examination or inspection of a photomicrograph of a cross-section of the foam. Applicant believes that the improved cushioning characteristics of this foam is also due in part to the retention of small-size cells in the overall foam structure.

The product of the present invention is a flexible polyurethane foam which finds particular utility in the manufacture of carpet underlay, padding and similar products. Because of the great number of variables involved in the process of the present invention; e.g., the wide choice of polymer/polyols and organic polyisocyantes precursors, the wide choice of surfactants and catalysts, and the numerous other additives optionally used, such as for example flame retardants, dyes and pigments; obtaining specifically desired properties in the finished product must, in good part, be done on an experimental basis.

The following examples are intended to illustrate more fully the nature of the present invention without acting as a limitation on the scope thereof. In the examples the following material were used.

Polymer/Polyol

High solids polymer/polyols are manufactured by Union Carbide Corporation and sold under the trade names E-490 and E-507. Applicant believes E-490 is a polyether polyol modified solely with acrylonitrile having a polymer solids content of about 38% by weight; while E-507 is a polyether polyol modified with a styrene-acrylonitrile copolymer also having a polymer solids content of about 38%. The hydroxyl numbers of E-490 and E-507 are both about 28.

Organic Polyisocyanate

Conventional tolylene diisocyanate (TDI) is produced by Rubicon and Mobay Chemical Co. The TDI used is a mixture of the 2,4- and 2,6-isomers of TDI in a ratio of 80:20 weight percent.

Catalysts

T-10, stannous octoate is manufactured by M and T Chemical Co. Equivalent organo-tin catalysts can be obtained from Witco Chemical Corp. under the trade name C-4 and from the Goldschmidt Corp. under the trade name Kosmos-16. A-127, is a tertiary amine catalyst available from Union Carbide Corp.

Silicone Surfactants

Y-10178 and L5810 are non-hydrolyzable polysiloxane-polyoxyalkylene copolymers manufactured by Union Carbide Corporation.

Polyol 3050 is an epoxy-modified polyether polyol manufactured by Texaco, Inc., presumably manufactured according to the process described in U.S. Pat. No. 4,316,991.

Silicone Anti-foaming Agent

L-501 is a silica-filled polydimethylsilicone oil manufactured by Union Carbide Corporation. In these examples, L-501 is added to the foam formulation as an admixture with the 3050 polyol. Unless otherwise indicated, the mixture comprised 100 parts polyol to 1 part L-501.

EXAMPLES 1-17

Table 1 set out the amounts and components of the compositions of Examples 1 to 17. Each of the foaming products produced according to these examples was prepared using the conventional one-shot technique on conventional equipment. All of the ingredients were metered separately by appropriately sized pumps into a single mixing head and the mixture was then dispensed onto the conveyor-type mold of a polyurethane slab stock machine. All parts are by weight unless otherwise stated.

Examples 18-21

In these and the following examples, the physical properties of the polyurethane foams were determined by the following ASTM tests:

| | |
|---|---|
| Tensile Strength | D-3574 |
| Indention Force Deflection | D-3574 |
| Elongation | D-3574 |
| Tear | D-3574 |
| Compression Set | D-3574 |

Table II sets forth various physical properties of selected foams produced according to the process of this invention. A foam prepared with a blend of 85% by weight high solids (38% polymer solids) polymer/polyol (E-507) and 15% by weight epoxy-modified polyether polyol (3050) is also presented in Table II as Example A for comparison purposes. Example A was prepared without using a filled diorganosilicone oil anti-foaming agent.

With respect to the properties illustrated in Table II, foams prepared according to this invention generally exhibit properties comparable to or better than those of the conventional foam represented by Example A. Of the inventive foams, Example 19 was prepared using the Union Carbide L5810 surfactant in place of the more efficient Y10178 surfactant. By increasing the amount of L5810 employed, foam properties could be further enhanced.

TABLE I

| Example No. | Polymer/Polyol | TDI | TDI Index | Silicone (Y10178) | Water | Tin | Amine | L501 | Pigment | Fire Retardant | Anti-Microbial Agent |
|---|---|---|---|---|---|---|---|---|---|---|---|
| 1 | 100* | 27.91 | 125 | 0.95 | 1.8 | 0.20 | 0.50 | $0.098^2$ | — | — | 1.68 |
| 2 | 100* | 27.91 | 125 | 1.05 | 1.8 | 0.23 | 0.70 | $0.029^2$ | — | — | 1.68 |
| 3 | 100** | 29.09 | 130 | 1.05 | 1.8 | 0.20 | 0.70 | $0.07^3$ | 3.5 | 10 | 2.1 |
| 4 | 100** | 28.93 | 130 | 1.05 | 1.8 | 0.20 | 0.60 | 0.04 | 3.5 | — | 2.1 |
| 5 | 100** | 28.93 | 130 | 1.00 | 1.8 | 0.24 | 0.75 | 0.026 | 3.5 | — | 2.1 |
| 6 | 100** | 28.93 | 130 | 0.90 | 1.8 | 0.24 | 0.75 | 0.028 | 3.5 | — | 2.1 |
| 7 | 100** | 29.34 | 130 | 1.00 | 1.8 | 0.27 | 0.80 | 0.0281 | 3.5 | — | 2.1 |
| 8 | 100** | 28.96 | 130 | 0.90 | 1.8 | 0.27 | 0.80 | 0.0292 | 3.5 | — | 2.1 |
| 9 | 100** | 29.00 | 131 | 0.90 | 1.8 | 0.27 | 0.85 | 0.0292 | 3.5 | — | 2.1 |
| 10 | 100** | 29.07 | 131 | $0.90^1$ | 1.8 | 0.295 | 0.85 | 0.0293 | 3.5 | 15 | 2.1 |
| 11 | 100** | 29.07 | 131 | 0.90 | 1.8 | 0.30 | 0.85 | 0.0293 | 3.5 | 15 | 2.1 |
| 12 | 100** | 30.63 | 133 | 0.92 | 1.9 | 0.26 | 0.85 | 0.0293 | 3.5 | 15 | 2.1 |
| 13 | 100** | 32.06 | 133 | 0.92 | 2.0 | 0.26 | 0.80 | 0.0293 | 3.5 | 15 | 2.1 |
| 14 | 100** | 32.00 | 133 | 0.92 | 2.0 | 0.26 | 0.78 | 0.0293 | 3.5 | 17 | 2.1 |
| 15 | 100** | 32.24 | 133 | 0.95 | 2.0 | 0.26 | 0.75 | 0.0336 | 3.5 | 15 | 2.1 |
| 16 | 100** | 30.94 | 133 | 0.95 | 1.85 | 0.28 | 0.78 | 0.0336 | 3.5 | 15 | 2.1 |

TABLE I-continued

| Example No. | Polymer/ Polyol | TDI | TDI Index | Silicone (Y10178) | Water | Tin | Amine | L501 | Pigment | Fire Retardant | Anti-Microbial Agent |
|---|---|---|---|---|---|---|---|---|---|---|---|
| 17 | 100** | 32.17 | 142 | 0.95 | 1.85 | 0.26 | 0.80 | 0.040 | 3.5 | 15 | 2.1 |

*E490
**E507
[1] L5810
[2] 25:1 Dilution
[3] 50:1 Dilution

TABLE II

| | Example | | | | |
|---|---|---|---|---|---|
| | 18 | 19 | 20 | 21 | A |
| Density (PCF) | 2.89 | 3.22 | 2.91 | 3.33 | 2.91 |
| Tensile (PSI) | 16.35 | 23.6 | 21.3 | 17.0 | 27.7 |
| Tear (PLI) | 1.76 | 2.19 | 1.3 | 1.95 | 1.8 |
| Elongation (%) | 55 | 90 | 61.7 | 54 | 116.7 |
| Compression Set (%) | | | | | |
| 50% | 5.1 | 48.5 | 4.9 | 2.9 | 12.6 |
| 90% | 4.6 | 76.0 | 4.3 | — | 15.4 |
| Humid Aged Comp. Set (%) 50% | 8.9 | 12.0 | 9.8 | 5.1 | 23.4 |
| CLD Loss (%) 50% | 30.1 | 34.0 | 32.4 | — | 36.4 |
| Ball Rebound (Ave. %) | 24 | 27 | 28 | 29 | 24.5 |

IFD loss at 25% deflection and only a 2% IFD loss at 65% deflection. With respect to height loss after 30,000 cycles, the foam showed no loss whatsoever using testing weights of 1 lb. and 25 lbs; and only 1% height loss using a 50 lb. test weight.

While certain specific embodiments of the present invention have been described with particularity herein, it should be recognized that various modifications thereof will occur to those skilled in the art. Therefore, the scope of the present invention is to be limited solely by the scope of the claims appended hereto.

TABLE III

| | Example | | | | | | | | |
|---|---|---|---|---|---|---|---|---|---|
| | 22 | 23 | 24 | 25 | 26 | 27 | 28 | 29 | A |
| Density | 2.89 | 2.85 | — | 3.22 | — | 2.91 | 2.93 | 3.33 | 2.91 |
| IFD (lb/50 in$^2$) | | | | | | | | | |
| 25% | 135 | 118 | 126 | 123.8 | 85.0 | 126 | 125 | 161 | 90.9 |
| 65% | 291 | 257 | 300 | 264.5 | 176.0 | 265.0 | 240 | 310 | 184.4 |
| 25% R | 93.0 | 83.0 | 86.0 | 91.6 | — | 89.0 | 88.0 | — | 55.3 |
| SAC Factor | 2.16 | 2.18 | 2.38 | 2.14 | 2.07 | 2.10 | 1.92 | 1.93 | 2.03 |

EXAMPLES 22–29

Table III sets forth the cushioning characteristics of selected foams produced according to the process of this invention. The properties of a conventional foam (Example A as described above) are also presented for comparison purposes. As shown, foams prepared using the process of this invention exhibit high I.F.D. values whie retaining relatively high SAC factors above about 1.9 and generally above 2.1. This combination of high impact force deflection values and high SAC factors is quite unexpected.

Example 26 was prepared using the Union Carbide L5810 surtactant in place of the more efficient Y10178 surfactant. By increasing the amount of L5810 employed, the deflection characteristics of the foam could be further enhanced.

EXAMPLES 30–32

Table IV sets forth the properties of selected foams produced according to the process of this invention before and after prolonged dynamic testing. The data indicates excellent retention/recovery of original deflection characteristics. Example 31 was prepared using the Union Carbide L5810 surfactant in place of more efficient Y10178 surfactant.

EXAMPLE 33

A two-inch thick, 15 inches by 11.75 inches test sample of foam prepared using the formulation of Example 17 and having the foam properties illustrated in Examples 21 and 29, was tested under conditions of dynamic shear (Roller Shear ASTM D-3574). After 30,000 cycles using a 30 lb. weight, the foam showed only a 9%

TABLE IV

| | Example | | |
|---|---|---|---|
| | 30 | 31 | 32 |
| IFD (lb/50 in$^2$) | | | |
| Initial 25% | 126 | 85.0 | 126.0 |
| 65% | 300 | 176.0 | 265.0 |
| 25% R | 86.0 | — | 89.0 |
| SAC Factor | 2.38 | 2.07 | 2.10 |
| After 20,000 Deflections | | | |
| 25% | 107.0 | 72.5 | 104.2 |
| 65% | — | 204.0 | 289.4 |
| After 7 Day Recovery | | | |
| 25% | 110.6 | 76.0 | 109.0 |
| 65% | — | 180.0 | 251.8 |
| SAC Factor | — | 2.37 | 2.30 |

I claim:
1. An improved process for preparing flexible polyurethane foams by the one-shot technique comprising co-reacting a fluid high-solids polymer/polyol and an organic polyisocyanate in the presence of an organo-tin catalyst, a tertiary amine catalyst, a blowing agent, a silicone-oxyalkylene surfactant and an amount of a filled diorganosilicone oil anti-foaming agent necessary to produce a predominately closed cell foam having an improved loas bearing resiliency.

2. The process of claim 1 wherein the diorganosilicone oil has the formula —R$_2$SiO]$_n$ where n is greater than 1 and R is selected from the group consisting of substituted and unsubstituted monovalent hydrocarbon groups.

3. The process of claim 2 wherein R is an unsubstituted hydrocarbon selected from the group consisting of methly, ethyl and phenyl.

4. The process of claim 2 wherein R is a substituted hydrocarbon selected from the group consisting of trifluoropropyl and trichoroethyl.

5. The process of claim 2 wherein the diorganosilicone oil is a polydimethylsilicone.

6. The process of claim 1 wherein the filled diorganosilicone oil contains an inert filler selected from the group consisting of silica, and the oxides of zinc, magnesium, aluminum, and titanium.

7. The process of claim 2 wherein the filled diorganosilicone oil contains an inert filler selected from the group consisting of silica, and the oxides of zinc, magnesium, aluminum, and titanium.

8. The process of claim 1 wherein a silica-filled polydimethylsilicone is used as the filled diorganosilicone oil.

9. The process of claim 1 wherein the filled diorganosilicone oil anti-foaming agent comprises about 0.02 percent to about 0.1 percent by weight on the polymer/polyol.

10. The process of claim 9 wherein the filled diorganosilicone oil anti-foaming agent comprises about 0.03 percent to about 0.08 percent by weight based on the polymer/polyol.

11. The process of claim 1 wherein the silicone-oxyalkylene surfactant comprises about 0.1 percent to about 5.0 percent by weight based on the polymer/polyol.

12. The process of claim 9 wherein the silicone-oxyalkylene surfactant comprises about 0.75 percent to about 1.25 percent by weight based on the polymer/polyol.

13. The process of claim 1 wherein the high-solids polymer/polyol contains polymerized ethylenically unsaturated monomer selected from the group consisting of acrylonitrile and mixtures of styrene and acrylonitrile.

14. The process of claim 13 wherein the polymer content of the high solids polymer/polyol is above about 30% by weight.

15. The process of claim 1 wherein the high solids polymer/polyol includes additional blended polyol.

16. The process of claim 14 wherein the high solids polymer/polyol includes additional blended polyol.

17. A predominately closed cell, flexible polyurethane foam having improved load bearing resiliency as obtained by reacting a fluid high-solids polymer/polyol and an organic polyisocyanate in the presence of a silicone-oxyalkylene surfactant and a filled diorganosilicone oil, said foam consiting essentially of a reaction product of said high-solids polymer/polyol and said organic polyisocyanate and having substantially a bivariate cell size distribution of large cells and small cells, wherein said large cells have average diameters between about 1.50 mm and about 7 mm, occur at any cross-section of said foam at a density of about 50 to about 200 cells per square inch of said foam, and are randomly distributed throughout a substantially continuous matrix of said small cells, said small cells having average diameters less than about 1.25 mm.

18. The foam of claim 17 wherein the diorganosilicone oil is a polydimethylsilicone.

19. The foam of claim 19 wherein the polydimethylsilicone contains an inert silica filler.

20. The foam of claim 17 wherein the high solids polymer/polyol contains poymerized ethylenically unsaturated monomer selected from the group consisting of acrylonitrile and mixtures of styrene and acrylonitrile.

21. The foam of claim 17 wherein the cells of said foam have struts with a thicknes of at least about 0.25 mm.

22. The foam of claim 22 wherein a major portion of the large cells have average diameter above about 1.75 mm and a major portion of the small cells have average diameters below about 1.0 mm.

23. The foam of claim 17 wherein the large cells occur at any cross-section of said foam at a density between about 75 to about 150 cells per square inch of said foam.

* * * * *